United States Patent
Mulvihill

[11] Patent Number: 5,590,989
[45] Date of Patent: Jan. 7, 1997

[54] FLEXIBLE ROUTER HEIGHT-ADJUSTMENT MECHANISM

[76] Inventor: Ralph Mulvihill, 7757 Steeple Chase Dr., Frankfort, Ill. 60423

[21] Appl. No.: 602,234

[22] Filed: Feb. 15, 1996

[51] Int. Cl.[6] .............................. B23C 1/20; B27C 5/00
[52] U.S. Cl. ................. 409/182; 144/135.2; 144/286.1; 409/218
[58] Field of Search ................................. 409/184, 181, 409/182, 220, 175, 183, 185, 210, 218; 144/286.1, 135.2

[56] References Cited

U.S. PATENT DOCUMENTS

| | | | |
|---|---|---|---|
| 1,370,895 | 3/1921 | Loomis | 144/135.2 |
| 1,457,492 | 6/1923 | Bloodgood | 83/471.3 |
| 1,820,162 | 8/1931 | Salvat | 144/135.2 |
| 2,045,422 | 6/1936 | Tautz | 144/135.2 |
| 2,582,573 | 1/1952 | Von Gunten | 144/135.2 |
| 2,592,187 | 4/1952 | Rohrer | 409/182 X |
| 2,799,305 | 7/1957 | Groehn | 144/253.1 |
| 4,445,412 | 5/1984 | Peters | 83/477.2 |
| 4,445,811 | 5/1984 | Sanders | 409/182 |
| 4,537,234 | 8/1985 | Onsrud | 409/97 X |
| 4,787,127 | 11/1988 | Beall | 29/26 A |
| 5,139,061 | 8/1992 | Neilson | 409/182 |
| 5,191,921 | 3/1993 | McCurry | 409/210 |
| 5,205,331 | 4/1993 | Onsrud | 144/135.2 |
| 5,207,253 | 5/1993 | Hosaino | 409/182 X |
| 5,275,517 | 1/1994 | Turnispeed et al. | 409/184 |

OTHER PUBLICATIONS

"Best of the Bunch: Routers for Table Mounting", *Wood Magazine*—Sept. 1995, pp. 56–59 which illustrates at p. 59, a rigid router adjustment mechanism.

"Plunge Router Micro Adjustment Knobs", Router Accessories catalog p. 22. This illustrates another router adjustment rod similar to that described in Item 13 above.

*Primary Examiner*—William R. Briggs
*Attorney, Agent, or Firm*—Lockwood, Alex, Fitzgibbon & Cummings

[57] ABSTRACT

A rotor height-adjustment mechanism is disclosed which is designed for mounting to the adjustment rod of a router mounted in a router table. The mechanism includes a flexible shaft member which may flex around and over interfering projections extending from the router housing. The flexible shaft has an engagement end with a threaded, hollow insert which engages the threaded adjustment rod of the router and further has a driving end with a drive means engagement member such as a socket which permits the height of the router within the router table to be adjusted.

20 Claims, 2 Drawing Sheets

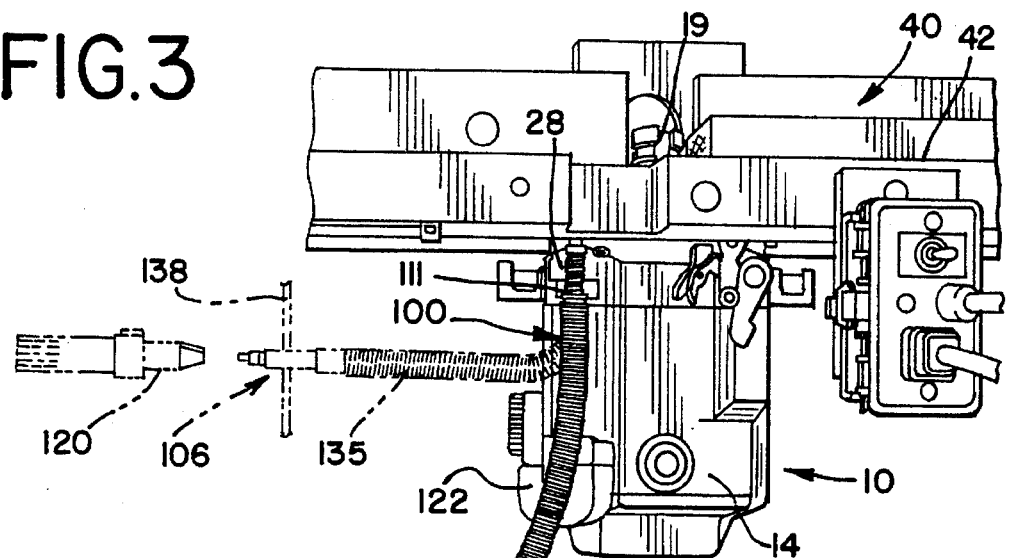
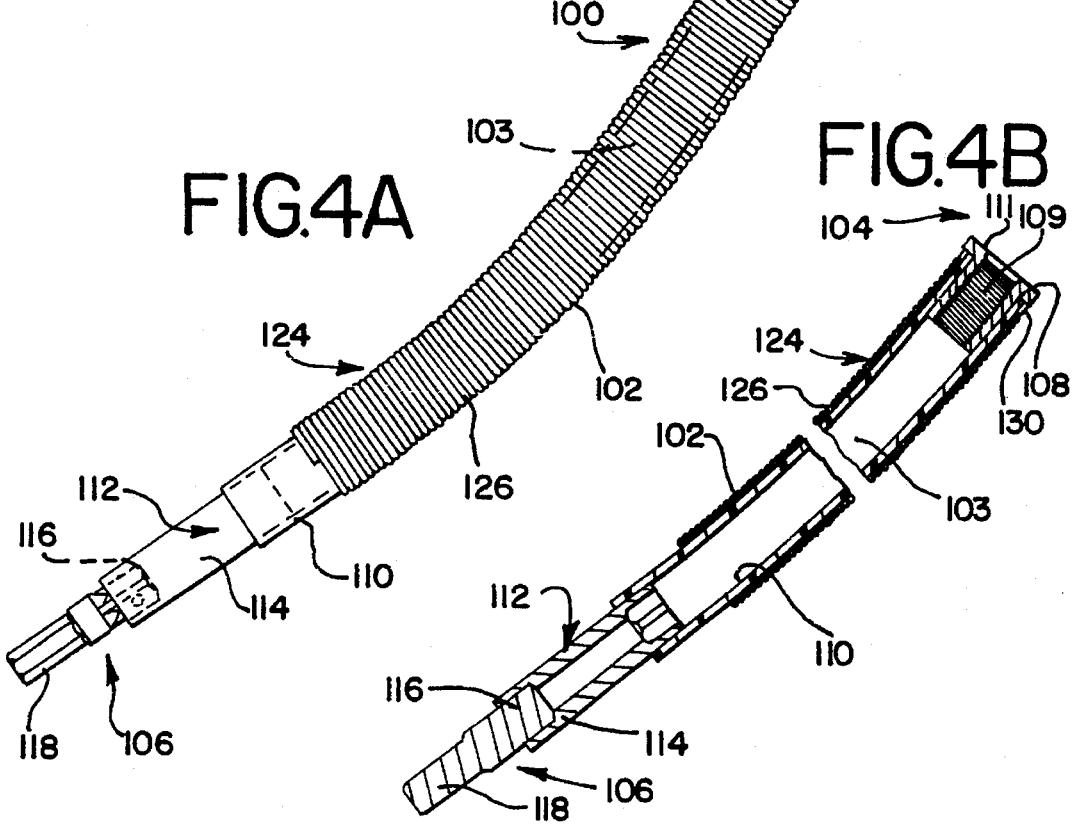

FLEXIBLE ROUTER HEIGHT-ADJUSTMENT MECHANISM

BACKGROUND AND SUMMARY OF THE PRESENT INVENTION

The present invention relates generally to adjustment mechanisms for power tools, and more particularly, to a flexible height-adjustment mechanism useful in adjusting the height of a router mounted within a router table.

Routers are popular woodworking tools which are widely used by professionals and amateur woodworkers alike. A router primarily consists of a motor mounted in a housing which drives a central shaft. A wide variety of cutting and shaping bits may be mounted on the central shaft of the router and used for cutting different profiles in wood.

A router may be used in two different manners. First of all, it may be used where its shaft and associated cutting bit are directed downwardly so that the bit cuts into a piece of wood while the woodworker drags the router along the top surface of the wood. A router may also be used in a direction opposite that described above, i.e. in an "upside-down" manner where the router drive shaft and bit are directed upwardly. This mounting is almost always used when the router is mounted into what is known in the art as a router table. The router cutting bit is directed upwardly through an opening in the top of the router table and the woodworker must move his wood along the top of the router table into contact with cutting bit, rather than moving the router along the wood as described above. In using a router table, the woodworker must set the height at which the router cutting bit projects above the router table surface.

One router gaining in popularity and particularly useful to most woodworkers is a plunge router. As its name implies, a plunge router may be moved up and down into contact with a piece of wood. The typical plunge router has a base mounted to it and is spaced apart from the router housing by one or more plunger rods which fit within recesses of the router housing. This structure which permits the router housing (and its cutting bit) to be slid along the plunge rods toward the base so that the cutting bit is brought into contact with the wood upon which the base sits.

In order to adjust the particular "depth" of the cut desired from a plunge router, such a router is typically equipped with a long, threaded adjustment rod which projects up from the router base and through a portion of the router housing. A nut is threaded onto this adjustment rod and provides a "stop" which limits the travel of the router housing along its plunge rods. In order to set the cutting depth, a woodworker turns the nut along the threaded rod to set the depth of cut of the router cutting bit. This adjustment is most often done by using by an open-ended wrench which creates an inconvenience to the woodworker. When a plunge router is mounted upside down within a router table, the access to the adjustment rod and associated depth stop nut is constrained and often the operating height of the router must be set prior to mounting the router in the table. If the height is not correct, the router must be taken off the table and reset. This procedure is time-consuming.

In recognition of the time-consuming nature of this characteristic of routers, those skilled in the art have developed after-market and custom router height-adjustment mechanisms. One such adjustment mechanism is described in the September 1995 issue of *Wood Magazine*. This mechanism uses a section of rigid tubing with a pair of threaded nuts wedged into one end and a knob for grasping and turning the mechanism located at the other end. Although effective, this type of mechanism is not without its own particular problems.

For example, the tubing used must be rigid so as to effectively turn the height-adjustment rod and move the router and its cutting bit up or down in the table. The tubing may wind up located within the router table at an inconvenient location which requires the woodworker to awkwardly sketch to gain access to and operate it. Additionally, the rigid tubing height-adjustment mechanism is not a universal solution because certain routers, such as the Porter-Cable 7539, have their housings configured in a manner does not permit it to accept a height-adjustment knob because the knob interferes with the router housing. Still other routers may have portions of their housings extending over the threaded rod, making the attachment of a rigid height-adjustment extension rod sleeve virtually impossible.

The present invention is directed to a flexible router height-adjustment mechanism which overcomes the aforementioned disadvantages. In doing so, it utilizes a minimum number of parts and provides a mechanism for adjusting the height of virtually any design of plunge router regardless of the configuration of the router housing.

In a router height-adjustment mechanism incorporating the principles of the present invention, an elongated height-adjustment extension is provided, the extension including a flexible sleeve having two opposing engagement ends, one end being configured to engage the threaded height-adjustment rod of a plunger router and the other end being configured to engage a driving tool such as a ratchet ball or power screwdriver.

The flexible sleeve may include a length of flexible tubing, such as flexible PVC tubing and may also have an exterior reinforcement sleeve in the form of a coil spring arranged coaxial therewith. The sleeve is capable, in one embodiment, of significant deflection when installed so that it may extend over any interfering portions of a plunge router housing.

Accordingly, it is a general object of the present invention to provide an improved router height-adjustment mechanism which attaches to the height-adjustment rod of a plunge router and which provides an extension away of the rod for easy access and which avoids interference with any portion of the router housing.

Another object of the present invention is to provide a flexible router height-adjustment mechanism which engages a router depth adjustment rod on a plunge router and provides a flexible shaft extension which may be coupled to a power driving tool for motor-driven adjustment of the router operating depth.

A further object of the present invention is to provide a kit of parts for use in converting an existing router into a plunge router having improved height-adjustment capabilities, in which the kit of parts includes a flexible sleeve with a reinforcing collar extending thereover, the sleeve having a threaded engagement end which is adapted to engage the height-adjustment rod of the router and further having a driving end having a drive socket which is adapted to receive the shaft of a driving tool such as a power screwdriver or ratchet ball.

These and other objects, features and advantages of the present invention will be apparent from a reading of the following detailed description, taken in conjunction with the accompanying drawings wherein like reference numerals refer to like parts.

BRIEF DESCRIPTION OF THE DRAWINGS

In the course of this detailed description, reference will be made to the attached drawings in which:

FIG. 3 is the same view as FIG. 2, but with a router height-adjustment mechanism constructed in accordance with the principles of the present invention mounted on the router and illustrating the general environment in which the invention is used;

FIG. 4A is an elevational view of the router height-adjustment mechanism of FIG. 3; and, FIG. 4B is a sectional view of the router height-adjustment mechanism of FIG. 4A.

DETAILED DESCRIPTION OF THE INVENTION

Figure 1:
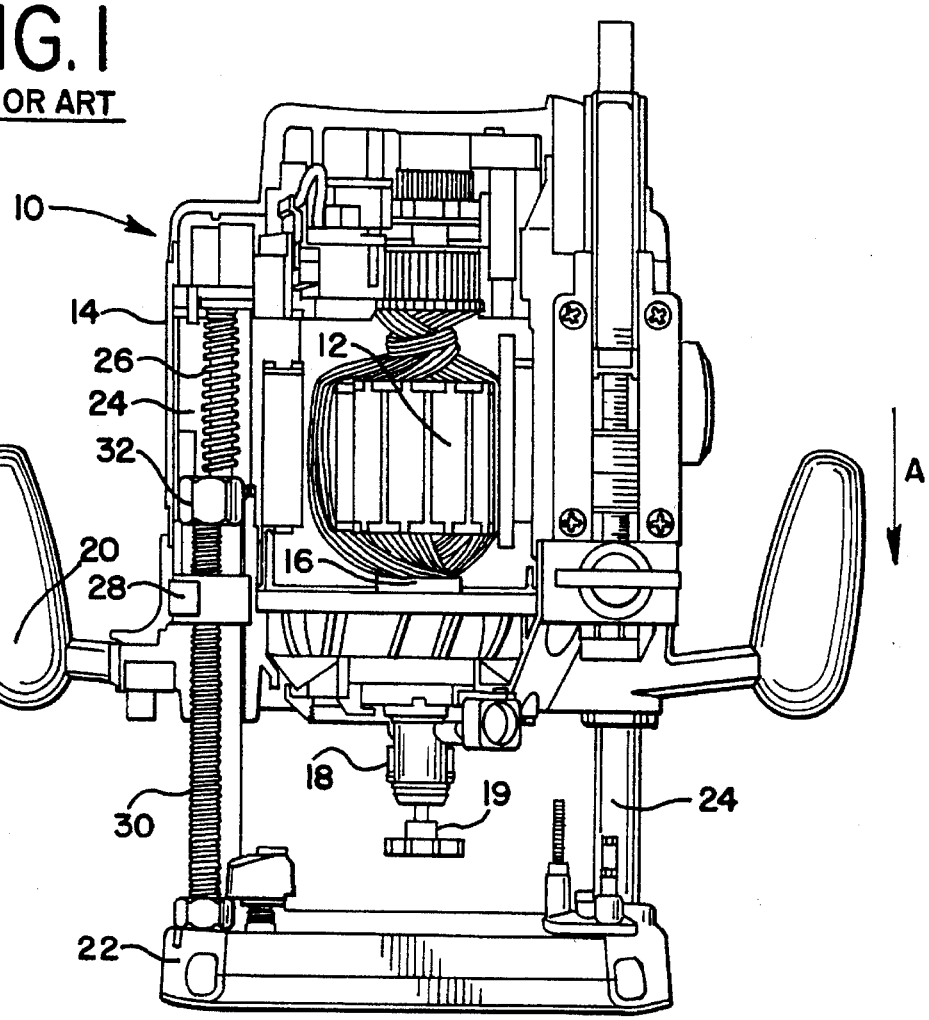
FIG. 1 is an elevational view partially in section of a plunge router to which the present invention is directed.

FIG. 1 depicts a conventional plunger router 10 having an internal motor 12, an exterior housing 14, a central drive shaft 16 with a collet 18 which receives a router bit 19. The router 10 has a pair of handles 20 which extend out from the housing 14 thereof and which provide a means for the woodworker to push the router 10 down toward a base 22 attached thereto so that the router cutting bit 19 held in the collet 18 makes contact with the wood under the base 22. In order to facilitate moving the router 10 up and down toward its base 22, the router 10 has a pair of plunge rods 24 affixed to the router base 22, hence the name "plunge" router. Coil springs 26 are disposed within the interior of the plunge rods 24 and provide a means by which the router 10 may return to its original height after plunging.

In order to provide a means for accurately setting the depth and height of the "plunge" of the motor 10, i.e., the maximum depth of the cut made in the wood by the router bit 19, the router 10 typically has, on the exterior of its housing 14, a fork or channel-collar 28 which receives a threaded rod 30 therein which extends up from the router base 22. A nut 32 is threaded into the threaded rod 28 and provides a stop which limits the downward movement of the router housing along the plunger rods 24 in the direction indicated by the arrow A of FIG. 1.

Figure 2:
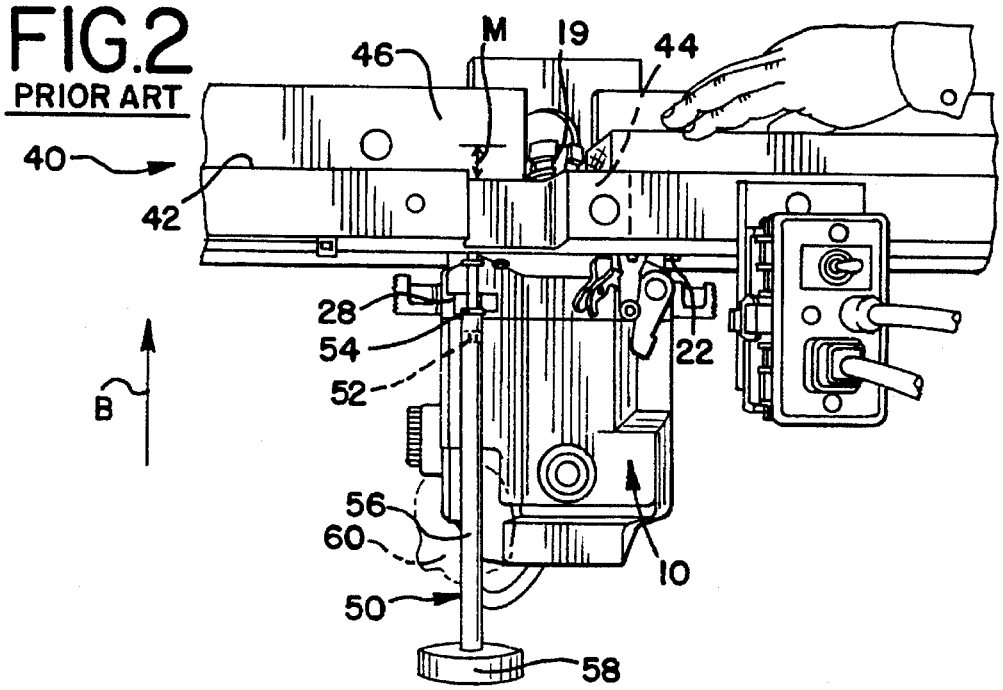
FIG. 2 is an elevational view of a plunge router mounted in place on a router table and having a known router height-adjustment mechanism attached thereto.

FIG. 2 illustrates a conventional installation of the router 10 in place within a router table 40. It can be seen and understood that the router 10 has been inverted in this installation and its base 22 has been affixed to the interior of the router table 40 by way of conventional mounting bolts (not shown). The router table 40 in essence includes a flat surface, or table top 42, which has a circular opening 44 disposed therein through and which router bit 19 may project. A siderail 46, known in the art as a "fence", is mounted to the tabletop 42 proximate to the router bit opening 44. The fence 46 is used by the woodworker as a guide against which a piece of wood 47 may be slid along the router table top 42 as shown in FIG. 2 so that the wood 47 contacts the router bit 19 at a predetermined distance from the fence.

Where the router is used in a router table 40, a woodworker is concerned with the movement of the router upwardly in the direction of arrow B inasmuch as it sets the operating height H of the router 10 above the router table top 42. The depth of the cut of the router bit 19 into the wood (i.e., the "height" of the router bit 19 projecting above the table top 42) is adjusted by positioning the nut 32 on the threaded height-adjustment rod 30, which holds the router 10 in place against the table top 42. Advancement of the nut 32 along the threaded rod 30 will advance the router 10 toward its base 22 in the direction indicated by B and likewise will advance the router bit 19 into the router table opening 44. Once the desired operating height H has been achieved, the nut 32 holds the router in place.

As mentioned herein above, the router 10 is thereby adjusted by turning the nut 32 to move it up or down along the threaded rod 30 as desired. This adjustment is either accomplished with a tool, such as an open-end wrench when the router 10 is mounted in the router table 40 or the router 10 is taken out of the router table and adjusted. In either case, this process is tiresome.

One solution in the art to this problem as set forth in the aforementioned September 1995 issue of *Wood Magazine*, has been to fabricate an extension 50 which replaces the nut 32 which engages the threaded rod 30. The extension 50 has a pair of nuts 52, a bushing 54, a rigid tube or sleeve 56 and a knob 58 at the bottom of the extension 50. By turning the knob 58, the extension bushing 54 rests against a flat abutment surface of the router housing fork 28 and the nuts 52 serve to assist the rigid sleeve 56 in moving up or down along the threaded rod 30 to maintain contact between the router fork 28 and extension bushing 54. This contact moves the router 10 upwardly or downwardly along the threaded rod 30 according to the direction of rotation.

However, certain routers, such as the Porter-Cable 7539, have oddly shaped router housings with interfering projections or abutments 60 which extend out and over the threaded rod 30, as indicated in phantom in FIG. 2, which prevents the knob 58 from functioning properly. Accordingly, the present invention is directed to a solution to this problem and an improvement over the rigid height-adjustment mechanism described above.

FIGS. 4A & 4B illustrate a router height-adjustment mechanism 100 constructed in accordance with the principles of the present invention. As illustrated in FIG. 4, it can be seen that the mechanism 100 includes an elongated, flexible shaft assembly, or extension 102 having opposing engagement and driving ends, 104, 106, respectively. The shaft assembly 102 is hollow having an interior passage 103 therein in order to accommodate a desired length of the router adjustment rod 30, which length may be substantially the entire length thereof. The engagement end 104 includes a threaded insert 108 held within a flexible sleeve 110, preferably formed from a material such as flexible PVC tubing.

The insert 108 preferably is hollow and has an opening 109 which communicates with the interior passage 103 of the shaft assembly 102. The interior threads of the insert 108 serve to threadedly engage the exterior threads of the router adjustment rod 30 (FIG. 3) and the insert preferably has a flat engagement face 111 which abuts against an opposing abutment surface of the router housing fork 28 so that rotation of the flexible shaft assembly 100 causes the insert 108 to advance or back off along the threaded adjustment rod 30 according to the direction of rotation. The hollow interior passage 103 of the flexible shaft assembly 100 has a length which is preferably equal to or greater than the length of the adjustment rod 30 and so permits the extension 102 to accommodate virtually the entire length of the router adjustment rod 30 therein in order to effect the full extent of adjustment of the router operating height H.

The driving end 106 includes a driving member 112, such as a socket 114 which receives within its socket opening 116, a drive stub 118. The driving end 106 permits the extension 102 to be rotated by means of a conventional socket wrench, while the drive stub 118 will permit the extension 102 to be rotated by means of a powered drive means, such as a powered screwdriver 120, or ratchet ball 121.

In an important aspect of the present invention, the shaft assembly 102 is flexible and formed from a flexible material such as the PVC tubing described above. This flexibility is important because it permits the extension to bend over and around interfering portions 60, 122 of the router housing 14 which project into the axial path drawn through the router housing channel collar 28, without compromising the ability of the woodworker to turn the threaded rod 30 and adjust the router cutting height as occurs with the height-adjustment mechanism 50 of FIG. 2.

The flexibility of the extension 102 may be enhanced by means of an exterior reinforcing sleeve 124, illustrated in the embodiment of FIGS. 3–4 as a hollow coil spring 126 which lies upon and outside of the inner sleeve 110. The spring 126 illustrated may also serve as the entire extension 102 itself. The engagement end threaded insert 108 may be set within either the open end of the flexible sleeve 110 or of the open end of the reinforcement member 124 and may be further permanently set therein by means of a suitable adhesive, such as an epoxy 130. The driving end of the inner sleeve 110 may be attached to the flexible sleeve 110 in a similar manner or may be attached to the reinforcing outer sleeve 124 such as by welding. It will be understood that the flexibility of the extension 102 permits, as stated above, the present invention to be used in the manner illustrated regardless of the exterior configuration of the router housing 14. The flexible inner sleeve 110 and reinforcement member 124 permit the extension 102 to bend or flex over such interferences so that the ability of the extension 102 to adjust the operating height of the router is not compromised.

The use of a flexible sleeve affords a woodworker many options in exploiting the present invention. For example, by utilizing a flexible drive shaft 135, such as a coil spring, in the manner illustrated in FIG. 3, a woodworker may install the invention in a router table in a manner so that the engagement end 104 attaches to the threaded adjustment rod 30 and the driving end 106 extends out through a wall 138 of the router table 40 so that a driving means, such as a powered screwdriver 120 may be used by the woodworker outside the router table 40.

It will be understood that other suitable constructions may be utilized for the router height-adjustment mechanism and still obtain the benefits of the present invention as is represented by the embodiments described hereinabove. Thus, it will be appreciated if the embodiments of the present invention which have been discussed herein are merely illustrative of a few applications of the principles of the invention. Numerous modifications may be made by those skilled in the art without departing from the true spirit and scope of the invention.

I claim:

1. A height-adjustment mechanism for adjusting the operating height of a router mounted in a router table wherein the router table includes a flat top, an opening extending through the router table top, and wherein the router includes a router housing enclosing a router motor having a drive shaft which projects through said housing and which receives a router bit thereon, a router base interconnected to the router housing by means of at least one plunge rod and the router being attached to the router table at the router table opening by way of the router base so that the router bit is aligned with said router table opening when said router is attached to said router table, the router bit defining an axis of said router, a threaded shaft which extends parallel to the router axis between said router base and the router housing, and which engages an abutment of said router housing, the height-adjustment mechanism including an elongated flexible member having two opposing ends, the flexible member having a body portion extending between its two ends, the body portion being flexible for substantially its entire length, one of said ends including an engagement end having means for engaging said router housing threaded shaft and the other of said two ends including a driving end having means for engaging a driving means for driving said flexible member in rotation and in engagement with said threaded shaft, said flexible member being capable of flexing over any portions of said router housing which extend into the path of said flexible member when attached to said router.

2. The router height-adjustment mechanism of claim 1, wherein said flexible member includes an interior flexible, hollow tube and an exterior reinforcement member in a coaxial relationship, the reinforcement member being disposed on the interior tube between said two opposing ends of said flexible member.

3. The router height-adjustment mechanism of claim 1, wherein said means for engaging said router threaded shaft includes a hollow, threaded insert disposed at said engagement end of said flexible member, said insert having an opening which communicates within the interior of said hollow tube.

4. The router height-adjustment mechanism of claim 1, wherein said driving end includes a socket member having a socket opening for engagingly receiving a driving member.

5. The router height-adjustment mechanism of claim 4, wherein said socket member has a socket opening which receives a driving shaft of a powered driving means.

6. The router height-adjustment mechanism of claim 2, wherein said flexible member includes an inner flexible plastic tube and said mechanism further includes an outer flexible reinforcement member disposed coaxially along said inner tube for a portion of its length, said outer reinforcement member being firmly attached to said inner tube proximate to said flexible member engagement end.

7. The router height-adjustment mechanism of claim 3, wherein said threaded insert extends partially within said flexible member and is adhesively attached thereto.

8. The router height-adjustment mechanism of claim 1, wherein said flexible member includes an inner flexible tube having a hollow passage extending therethrough, said router height-adjustment mechanism further including an outer reinforcement member disposed coaxially along the inner tube and said engagement end includes a threaded, hollow insert extending partially within said inner tube and communicating with said inner tube hollow passage, the threaded insert being adhesively attached to at least one of either said inner tube and outer reinforcement member.

9. The router height-adjustment mechanism of claim 2, wherein said exterior reinforcement member includes a coil spring.

10. The router height-adjustment mechanism of claim 8, wherein said outer reinforcement member includes a coil spring.

11. A height-adjustment mechanism for attachment to a plunge router which is capable of being mounted in a router table, said router having a motor, an exterior housing enclosing the motor, a drive shaft extending from the motor out of said exterior housing, the drive shaft having an adjustable collet, said router further including a router base, at least one plunge rod slidably interconnecting the router housing with the router base and an adjustment rod extending between said router base and said router housing, the adjustment rod being rotatably received at least partially within a support portion of said router housing, the support portion having an adjustment surface disposed thereon transversely to an axis of said adjustment rod, and the router table having an opening which receives a cutting bit held in said router collet and means surrounding the router table opening for engaging said router base for holding said router in an inverted position beneath a top surface of said router table so that said router bit is aligned with and projects into said router table opening to a predesired operating height above the router table top surface, the height-adjustment mechanism facilitating adjustment of the predesired operating height of said router cutting bit regardless of the exterior configuration of said router housing, said height-adjustment mechanism comprising: a flexible shaft assembly of predetermined length having two opposing ends, the flexible shaft assembly including a flexible shaft and a reinforcement member, the flexible shaft and reinforcement members being disposed in a coaxial relationship for at least a portion of the length of said flexible shaft member, said flexible shaft assembly including an engagement opening disposed at a first of said two opposing ends which engagingly receives a portion of said router adjustment rod when said height-adjustment mechanism is installed on said router, said flexible shaft assembly further having a driving member disposed at a second of said two opposing ends, the driving member being received in driving engagement within a powered driving means when the driving means is attached to said height-adjustment mechanism, said driving means providing rotation to said flexible member which in turns rotates said router adjustment rod to thereby move said router bit up and down within said router table opening to attain said predesired operating height, said flexible shaft member and said reinforcement member having a flexibility which permits said flexible shaft assembly to flex over any interfering portions of said router housing which are interferingly aligned with said router adjustment rod axis without compromising the ability of said flexible shaft assembly to rotate upon said router adjustment rod so that said router operating height may be adjusted regardless of the orientation of said flexible shaft member with respect to said router adjustment rod.

12. The height-adjustment mechanism of claim 11, wherein said reinforcement member includes a tubular metal sleeve.

13. The height-adjustment mechanism of claim 11, wherein said router adjustment rod includes a threaded rod and said flexible shaft member includes a hollow tubular sleeve having an interior passage with a length at least equal to that of said router adjustment rod, and said flexible shaft assembly engagement opening including a threaded insert extending partially within said tubular sleeve.

14. The height-adjustment mechanism of claim 13, wherein said reinforcement member includes a coil spring having two opposing ends, one of said spring ends being firmly attached to said tubular sleeve proximate to said flexible shaft assembly engagement opening.

15. The height-adjustment mechanism of claim 11, wherein said flexible shaft assembly driving member includes a socket member having a socket opening which receives said driving means drive member therein.

16. The height-adjustment mechanism of claim 13, wherein said tubular sleeve lies interior of said reinforcement member and is formed from a flexible plastic, and said reinforcement member includes a metal coil spring.

17. The height-adjustment mechanism of claim 13, wherein common first ends of said tubular sleeve and reinforcement member are attached to each other and common second ends of said tubular sleeve and reinforcement member are not attached to each other.

18. A kit of parts for use in providing a plunge router with a height-adjustment mechanism, the router being mounted in a router table, and said router having a motor, an exterior housing enclosing the motor, a drive shaft extending from the motor out of said router housing with an adjustable collet, a router base, at least one plunge rod slidably interconnecting the router housing with the router base, an adjustment rod extending between said router base and said router housing, the adjustment rod being at least partially received within a support portion of said router housing, the support portion having an adjustment surface disposed thereon transversely to an axis of said adjustment rod; and the router table having a top which has an opening which receives a cutting bit held in said router collet and means surrounding the router table opening for engaging said router base for holding said router in an inverted position beneath said router table top so that said router bit is aligned with and projects into said router table opening to a predesired operating height above the router table top, the height-adjustment mechanism facilitating adjustment of the predesired operating height of said router cutting bit regardless of the exterior configuration of said router housing, said height-adjustment mechanism; the kit of parts comprising: a hollow flexible shaft of predetermined length having two opposing ends; a router adjustment rod engagement insert which engages a first opening of said flexible shaft disposed at one of said two opposing ends thereof, the insert having an opening therein opening disposed which engages said router adjustment rod when said kit is assembled and installed on said router; and, a driving member which engages a second opening of said flexible shaft disposed at the other of said two opposing ends and which has an opening which engages a drive member of a powered driving means when said kit is assembled and installed on said router, said driving means providing rotation to said flexible shaft which in turns rotates said router adjustment rod to thereby move said router bit up and down within said router table opening to attain said predesired operating height, said flexible shaft having a flexibility which permits it to flex over any interfering portions of said router housing which are interferingly aligned with said router adjustment rod axis without compromising the ability of said flexible shaft to rotate said router adjustment rod when said kit is assembled and installed upon said router so that said router operating height may be adjusted regardless of the orientation of said flexible shaft with respect to said router adjustment rod.

19. The kit of parts of claim 18, further including a flexible, reinforcement member which extends over said flexible shaft in a coaxial relationship therewith.

20. The router height-adjustment mechanism of claim 1, wherein said flexible member includes a hollow coil spring with an interior passage extending longitudinally therethrough, the interior passage having a length at least equal to a length of said router threaded shaft.

* * * * *